(12) United States Patent
McCormack

(10) Patent No.: US 10,783,041 B2
(45) Date of Patent: Sep. 22, 2020

(54) BACKUP AND RECOVERY OF DATA FILES USING HARD LINKS

(71) Applicant: McAfee LLC, Plano, TX (US)

(72) Inventor: David McCormack, Cork (IE)

(73) Assignee: McAfee, LLC, Santa Clara, CA (US)

( * ) Notice: Subject to any disclaimer, the term of this patent is extended or adjusted under 35 U.S.C. 154(b) by 261 days.

(21) Appl. No.: 15/713,236

(22) Filed: Sep. 22, 2017

(65) Prior Publication Data
US 2019/0095285 A1    Mar. 28, 2019

(51) Int. Cl.
*G06F 17/00* (2019.01)
*G06F 11/14* (2006.01)
*G06F 16/16* (2019.01)
*G06F 21/62* (2013.01)

(52) U.S. Cl.
CPC ........ *G06F 11/1451* (2013.01); *G06F 16/162* (2019.01); *G06F 21/6218* (2013.01); *G06F 11/1448* (2013.01); *G06F 11/1458* (2013.01); *G06F 11/1471* (2013.01); *G06F 2201/80* (2013.01); *G06F 2201/805* (2013.01); *G06F 2201/82* (2013.01)

(58) Field of Classification Search
None
See application file for complete search history.

(56) References Cited

U.S. PATENT DOCUMENTS 5,832,527 A * 11/1998 Kawaguchi ............. G06F 16/10
7,885,938 B1 * 2/2011 Greene ............... G06F 11/1469
707/674
9,003,533 B1 * 4/2015 Gummerman ........ G06F 21/566
707/678
9,804,957 B1 * 10/2017 Chopra ............... G06F 11/3692
2008/0086518 A1 * 4/2008 Balakrishnan ...... G06F 11/1451
2008/0250072 A1 * 10/2008 Nguyen ............. G06F 11/1435
2008/0256242 A1 * 10/2008 Liebman .............. G11B 27/034
709/226

(Continued)

OTHER PUBLICATIONS

Wikipedia, "Hard Link", <https://en.wikipedia.org/wiki/Hard_link>, last edited on Jul. 25, 2017 (5 pages).

(Continued)

*Primary Examiner* — Hasanul Mobin
(74) *Attorney, Agent, or Firm* — Hanley, Flight & Zimmerman

(57) ABSTRACT

Methods, apparatus, systems and articles of manufacture to perform backup and recovery of data files using hard links are disclosed. Example methods disclosed herein include determining whether a first operation to be performed on a target file by a thread of a process is a file deletion operation, wherein the target file is referenced by a first hard link. Disclosed example methods also include creating, in response to the first operation being a file deletion operation, a second hard link to the target file, where the creation of the target hard link occurs while the thread of the process performing the deletion is blocked. Disclosed example methods further include returning control to the thread of the process performing the deletion after the second hard link is created to enable the operation to be performed on the target file.

14 Claims, 8 Drawing Sheets

(56) References Cited

U.S. PATENT DOCUMENTS

| | | | |
|---|---|---|---|
| 2009/0183002 A1* | 7/2009 | Rohrer | G06F 11/1458 713/168 |
| 2009/0307276 A1* | 12/2009 | Dolan, IV | G06F 8/65 |
| 2010/0287338 A1* | 11/2010 | An | G06F 11/2058 711/114 |
| 2011/0125818 A1* | 5/2011 | Liebman | G06F 16/192 707/829 |
| 2013/0066835 A1* | 3/2013 | Haubold | G06F 16/1774 707/640 |
| 2014/0108475 A1* | 4/2014 | Yamada | G06F 16/21 707/829 |
| 2014/0258242 A1* | 9/2014 | Kanfi | G06F 16/13 707/690 |
| 2015/0234712 A1* | 8/2015 | Fei | G06F 16/137 707/639 |
| 2015/0269183 A1* | 9/2015 | Avati | G06F 16/1844 707/634 |
| 2016/0232177 A1* | 8/2016 | Khurange | G06F 11/1448 |

OTHER PUBLICATIONS

Microsoft, "Mklink", <https://technet.microsoft.com/en-us/library/cc753194>, Apr. 17, 2012 (11 pages).

* cited by examiner

BACKUP AND RECOVERY OF DATA FILES USING HARD LINKS

FIELD OF THE DISCLOSURE

This disclosure relates generally to data recovery, and, more particularly, to backup and recovery of data files using hard links.

BACKGROUND

In recent years, malicious software, also referred to as malware, has taken on numerous new forms and advanced in capabilities at an increasing rate. Software tools exist to detect and eliminate these threats, as well as to mitigate or remediate any harm that they cause to an end-user's computing device. Some forms of malicious software can delete files from the computing device without the end-user's knowledge or consent.

Figure 1:
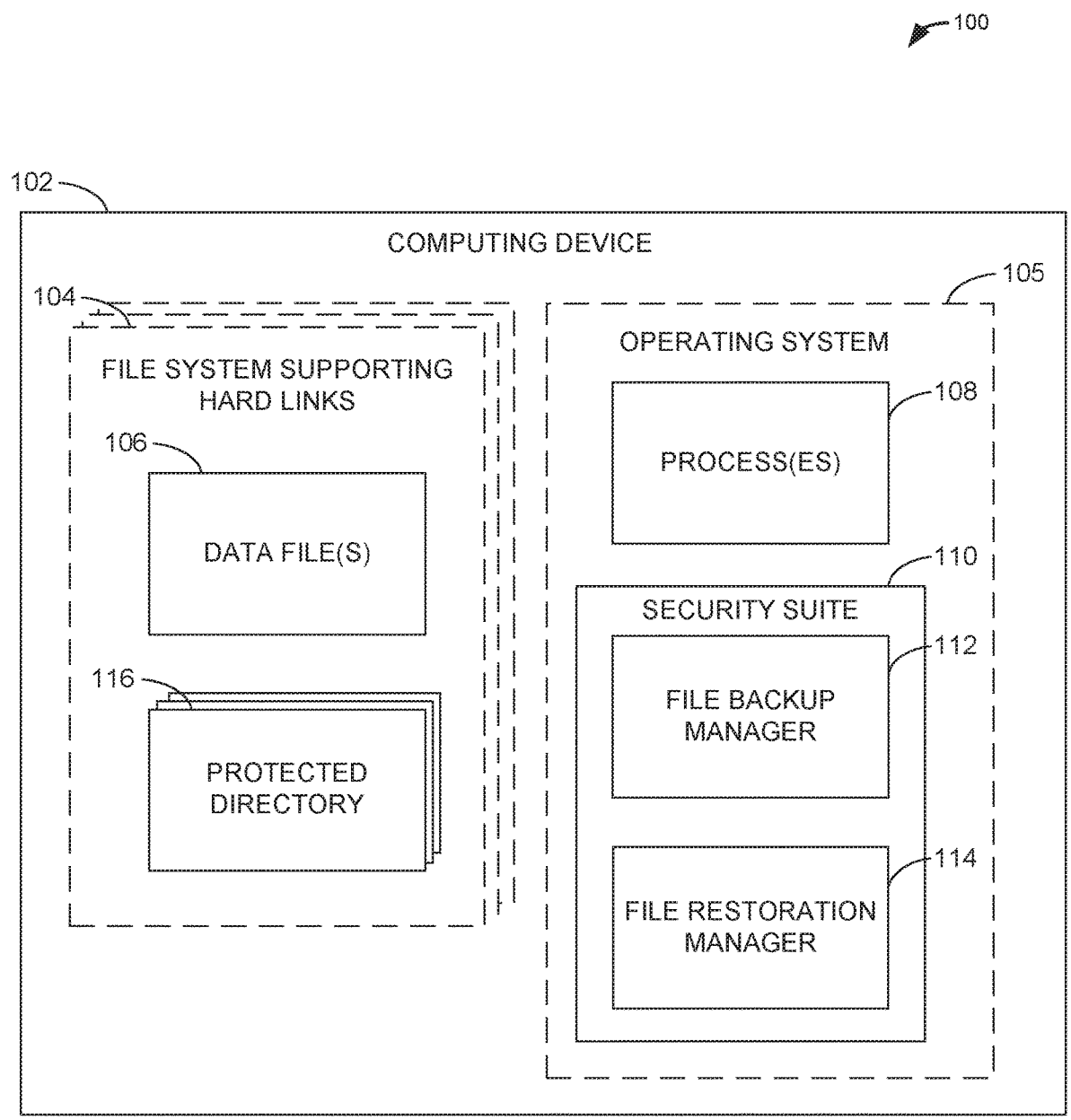
FIG. 1 is a schematic illustration of an example personal computing device including an example security suite implemented in accordance with the teachings of this disclosure.

The figures are not to scale. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures, layers, links, connections, etc.).

DETAILED DESCRIPTION

Example methods, apparatus, systems and articles of manufacture (e.g., non-transitory, physical storage media) to perform backup and recovery of data using hard links are disclosed herein. Example methods disclosed herein to protect data with hard links include determining whether a first operation to be performed on a target file by a thread of a process is a file deletion operation. The target file is referenced by a first hard link. For example, the first hard link can correspond to an original hard link pointing to the target file. Disclosed example methods also include creating, in response to the first operation being a file deletion operation, a second hard link to the target file. For example, the second hard link can correspond to a backup hard link for the target file. The thread of the process to perform the deletion is blocked while the second hard link is created. Disclosed example methods further include returning control to the thread of the process after the second hard link is created to enable the first operation to be performed on the target file.

Some disclosed example methods further include generating a transaction log entry including an original file name of the target file and a backup file name corresponding to the second hard link in response to determining the first operation is the file deletion operation.

Additionally or alternatively, some example methods further include receiving a request for the restoration of the target file after the target file has been deleted. Some such example methods include restoring, in response to the request, the target file using the second hard link. Some such example methods also include restoring the target file by creating a third hard link based on the second hard link and the original file name of the target file. In some such examples, the original file name is retrieved from a transaction log. In some such examples, the third hard link represents a replacement hard link of the original hard link to the target file. Some such example methods further include deleting the second hard link after the target file has been restored.

Additionally or alternatively, in some disclosed example methods, the second hard link is created in a protected directory.

These and other example methods, apparatus, systems and articles of manufacture (e.g., non-transitory, physical storage media) to perform backup and recovery of data files using hard links are disclosed in greater detail below.

An example application of backup and recovery of data files using hard links in accordance with the teachings of this disclosure includes the handling of file deletions rendered by a malicious program. A malicious program, also referred to herein as "malware", can be any program which performs harmful or potentially harmful activity on a computer, generally without the knowledge and/or consent of the user. Malware includes, but is not limited to, viruses, Trojan horses, backdoors, keyloggers, rootkits, ransomware, remote-access tools, worms, and exploits. Malware can perform various functions, such as the modification of a user's personal files or eavesdropping on a user's activity. Ransomware is an example form of malware in which a user's data is made inaccessible, either via deletion or modification (e.g., via encryption or corruption), and held for ransom (e.g., until a payment for the return of the data is made).

Various malware protection tools exist to protect computing devices from the threat of malware. Traditionally, malware protection tools attempt to combat malware using techniques including monitoring of downloaded files and comparison of downloaded files to known malware signatures (also referred to as definitions), monitoring of system processes for modifications to critical system files, monitoring of new files for a designated period to ensure their behavior is not suspicious, as well as many other techniques. In some examples, after a malware protection tool technique identifies malware on the computing device, the tool may eliminate the malware outright (e.g. by terminating the malware and deleting the malware's file data) or quarantine it (thereby preventing the malware from doing further harm). While these are sufficient for many malware threats, in some examples, undetected, advanced or highly complex threats evade the detection or intervention of tools. In such cases, malware protection methods may implement mechanisms to protect, backup and recover files in the event of malware going undetected and/or successfully modifying (e.g., encrypting, corrupting or deleting) the files.

Conventionally, a copy-on-write technique has been used to protect data in the event of a sustained malware attack. Copy-on-write refers to the creation of a complete copy of a file when an operation, such as an overwrite, truncation, deletion, and/or any other potentially destructive operation, is performed on the file. When a process, such as a malware program, attempts to perform an operation on a file, a copy-on-write technique can be used to create a copy of the file prior to the modification being performed, thereby enabling future recovery of the file. However, the copy-on-write technique can consume significant amounts of storage space, as copy-on-write duplicates the file data in its entirety. Also, copy-on-write may consume significant amounts of processing resources during the copying process and incur perceptible delays on the computing device while the complete file is copied. This use of the copy-on-write technique to protect data files can have a noticeable impact on the user experience.

In contrast with such prior tools that employ copy-on-write techniques, example malware protection tools and, more generally, example security suites that support backup and recovery of data files using hard links in accordance with the teachings of this disclosure can achieve lower storage utilization profiles and higher backup speeds. A hard link refers to a file name, typically in a directory entry, that points or links to a target data file. In contrast, a soft link, also referred to as a shortcut, indirectly links to the target file by pointing to the file's hard link, or another location from which direct access to the file is possible. If a hard link is deleted, but another hard link exists to the target file data, the data will still be accessible and the original file can be restored. Hard links are supported by many operating systems (e.g., Windows NT® and later Windows® operating systems, Linux®, Android® and macOS®) and file systems (e.g., New Technology File System (NTFS)). Use of hard links as disclosed herein, rather than direct copying of data, to create a backup enables a streamlined backup solution that is highly time-efficient and storage efficient, resulting in little to no perceptible slowdown to the end-user.

Turning to the figures, a block diagram of an example system 100 structured to backup and restore data files using hard links in accordance with the teachings of this disclosure is shown in FIG. 1. The example system 100 of FIG. 1 is implemented by an example computing device 102. The computing device 102 includes an example file system 104 supporting hard links and an example operating system 105. The file system 104 stores one or more example data files 106. The operating system 105 supports execution of one or more example processes 108 and an example security suite 110. The security suite 110 includes an example file backup manager 112 and an example file restoration manager 114. An example protected directory 116 is also maintained on the file system 104.

The example computing device 102 of the illustrated example shown in FIG. 1 can be implemented by any device with a file system supporting hard links (e.g., for organizing data on a storage device). In some examples, the computing device 102 may be a desktop computer, a laptop computer, a personal tablet device (e.g., Kindle®), a smart phone (e.g., iPhone®), a Smart TV, or a wearable technology involving a computing device (e.g., Fitbit®). In the illustrated example, the computing device 102 is capable of accessing, storing, and retrieving files from a volatile and/or a non-volatile memory, as well as any associated mass storage device.

The example file system 104 of the illustrated example shown in FIG. 1 is a system of organizing a storage apparatus into data structures to store data files and includes functionality to support hard links. The example file system 104 can be any file system which allows for the creation and use of hard links. For example, beginning with the introduction of the New Technology File System (NTFS) in the Windows® operating system, hard links are supported in the Windows® product line of operating systems. In examples using the NTFS implementation, hard links can be created within the same file storage area (e.g., volume) as the data file. A hard link refers to a file name, typically in a directory entry, that points or links to a target data file. In the NTFS, for example, a hard link can be created in any location on the same partition and on the same volume of a storage drive containing the data file which the hard link will reference. On the NTFS, hard links use no additional storage space, and link directly to the original data file. In the case of multiple hard links to the same file data on the NTFS file system, if the file data is altered, all hard links will be associated with the new data file. Additionally, on the NTFS file system, the deletion of one hard link to a data file does not affect the existence of the data file if another hard link to the same data file exists. Some example file systems (e.g., Hierarchical File System Plus) may create hard links by creating separate files with pointer metadata in a protected directory. In some examples, there may be multiple file systems 104 on the computing device 102. In some such examples, each file system 104 corresponds to a respective different storage volume (e.g., a first file system 104 for a C: drive, a second file system 104 for an E: drive, etc.).

The example operating system 105 of the illustrated example shown in FIG. 1 is a platform to enable the utilization of a computer's hardware for useful purposes and to provide an infrastructure on which computer software can operate. The operating system 105 executes instructions that enable software and ultimately the end-user to utilize the system's resources (e.g., utilize storage, utilize processing power, utilize communications hardware, etc.). For example, the operating system 105 can be implemented by Microsoft Windows®, macOS®, Linux, Android®, or any other operating system. The example operating system 105 enables the execution of one or more processes 108. The example operating system 105 also enables the execution of the security suite 110.

In the illustrated example of FIG. 1, the example data files 106 correspond to any data that is stored on the computing device 102. For example, the data files 106 can include files representing visual media (e.g., photographs), auditory media (e.g., music), text-based files, multimedia (e.g., video) and/or any other data representations. The data files 106 can be located anywhere on the physical or virtual memory of the computing device 102 and/or in memory/storage connected to the computing device 102 (e.g., via removable storage, network connections, etc.). In some examples, the data files 106 may be stored in locations that are encrypted and/or protected, such as in the protected directory 116.

The examples processes 108 of the illustrated example shown in FIG. 1 correspond to any application or other process that executes on the computing device 102. The example processes 108 can include instructions executed by the computing device 102 (e.g., by one or more processes of the computing device 102) to perform OS-level operations of the operating system 105 (e.g., to configure the user environment, run drivers, manage desktop, etc.). Additionally or alternatively, the example processes 108 can include instructions that are executed upon the initiation of an application by a user for a specific purpose (e.g., a word processor, an image editing software, a web browser, etc.). The example processes 108 can also include malicious processes, which perform or have the capability to perform harmful operations on the computing device 102, generally without the knowledge and consent of a user. In some examples, a given process 108 perform tasks and/or execute instructions (e.g., perform a file deletion, perform a file copy, etc.) using one or more threads of the process 108.

An example malicious process 108 is a ransomware attack, by which some or all of the data files 106 are corrupted, encrypted, deleted, and/or otherwise manipulated to make them inaccessible to the user until the payment of a specific ransom designated by the perpetrator. In some example ransomware attacks, the original data file is written to a new file which is encrypted, and the original data file is deleted. Example processes 108 include, but are not limited to, viruses. Trojan horses, backdoors, keyloggers, rootkits, remote access tools, worms, exploits, etc. In some examples, a malicious process may not fit into one of these specific types but may be a combination of several types of malware or a unique form of malware. In some examples, the processes 108 that are malicious can modify an existing process in an attempt to avoid detection, or utilize the name of a common process (e.g., svchost.exe on Windows operating systems) to avoid detection. The example processes 108 may also contain processes which are not entirely malicious (e.g., such as processes that have aspects or threads which perform tasks that are not harmful and are known and consented to by the user) but contain specific threads which are malicious. In some examples, the example processes 108 execute instructions from a storage device that is a component of the computing device 102 (e.g., a hard disk drive, random access memory, removable storage, etc.). In some examples, the processes 108 execute instructions obtained via a network (e.g., the Internet).

The example security suite 110 of the illustrated example of FIG. 1 can take action in accordance with the teachings of this disclosure to combat malicious processes on the computing device 102. The example security suite 110 operates to pre-empt the loss of some or all of the data files 106 by backing up the data files 106 and restoring, when appropriate, some or all of the data files 106 in the event of a deletion. The example security suite 110 contains the file backup manager 112 and the file restoration manager 114. In some examples, the security suite 110 is implemented as one application. In some examples, the security suite 110 may operate as multiple applications handling various mechanisms working in combination to protect files. In some examples, the security suite 110 executes instructions from a storage device and utilizes resources that are components of the computing device 102 (e.g., a hard disk drive, random access memory, removable storage, etc.). In some examples, the example processes 108 execute instructions obtained via a network (e.g., the Internet). In some examples, a combination of instructions from a storage device and instructions obtained via a network can be utilized to implement the security suite 110.

In the illustrated example in FIG. 1, the example file backup manager 112 generates file backups by creating a backup hard link for a data file 106 that is subject to a pending deletion. The example file backup manager 112 is able to write to the protected directory 116 to perform file backups. Additionally or alternatively, the example file backup manager 112 may write backup data to other physical and/or virtual storage locations aside from the protected directory 116. In some examples, the file backup manager 112 is a component of the security suite 110, and utilizes the resources and storage allocated to the security suite 110. In some examples, the file backup manager 112 operates as a stand-alone application and may not share resources or storage with other components of the security suite 110.

As noted above, the example file backup manager 112 generates a hard link referencing a data file in response to a pending file deletion of that data file. In some examples, the file backup manager 112 can generate hard links for a specified or defined subset of files in response to the pending deletion of any of these files (e.g., critical system files). In some examples, the file backup manager 112 is capable of creating a full backup copy of a target data file in the event that a computing device does not support hard links. In some examples, the file backup manager 112 can consist of multiple components (e.g., multiple file backup managers 112) as opposed to one component.

The file restoration manager 114 of the illustrated example of FIG. 1 enables the restoration of a previously deleted file based on the backup hard link backup generated by the file backup manager 112 for that file. The file restoration manager 114 is capable of accessing the protected directory 116 to perform file restorations, as well as any other locations where the file backup manager 112 stores backup hard links. In some examples, the file restoration manager 114 is a component of the security suite 110, and utilizes the resources and storage allocated to the security suite 110. In some examples, the file restoration manager 114 operates as a separate application from the security suite 110, and may not share resources or storage with other components of the security suite 110. In some examples, the file restoration manager may restore the original file using a complete copy of the target file in the event that a backup hard link is not available. In some examples, the file restoration manager 114 and the file backup manager 112 is implemented as one combined component, or as several components.

In the illustrated example of FIG. 1, the protected directory 116 is a directory structure or any other file management structure maintained in a location of file storage which is protected to prevent processes other than those integral to or authorized by the security suite 110 from accessing or modifying the contents of the directory 116. In some examples, the protected directory 116 is encrypted. The example protected directory 116 can be stored on the mass storage of the computing device 102. Additionally or alternatively, the protected directory 116 can be stored on a separate physical or virtual storage media (e.g., storage disks) to which only the security suite 110 and other authorized processes are provided access. In some examples, the protected directory 116 can be password protected or similarly protected with a code or mechanism to allow access (e.g., read/write privileges) to the protected directory 116. In some examples, multiple protected directories 116 may exist within a single file system 104. In examples, each file system 104 on the computing device 102 includes at least one respective protected directory 116.

In the illustrated example, the protected directory 116 of any file system 104 which exists on the computing device 102 is accessed by the file backup manager 112 for the creation of backup hard links to target data files, and by the file restoration manager 114 for the recovery of files using the backup hard links stored in the protected directory 116.

In some examples, full file copies may be stored in the protected directory 116 along with or instead of hard links. In some examples, the protected directory 116 can be used to store log data, including data pertaining to the deletion events that occur on the computing device 102 (e.g., such as data pertaining to file names, deletion timestamps, file locations, process information, etc.).

In operation, the computing device 102 is configured with one or more file system(s) 104 supporting hard links. On these file system(s) 104, the computing device 102 stores data files 106. Some of these data files 106 are output type files that provide useful end-user outputs (e.g., photographs, music, television shows, etc.), while other files are instructions that instantiate processes 108. Among these processes 108 may be one or more malicious process(es). When any thread of a process initiates a deletion of one or more data file(s) 106, the process is effectively blocked by the security suite 110 while the file backup manager 112 is invoked. The file backup manager 112 then creates a backup hard link to the target data file 106 for any file pending deletion, as well as a transaction log of the process information and information on the target file to be deleted. As used herein, the term "target file" refers to the file targeted for deletion by a process. The backup hard link is stored in the protected directory 116 of the file system 104 that includes the target data file 106. The thread that was blocked is then unblocked and deletes the target file by, for example, deleting the original hard link referencing the target file. If the thread that deleted the target file is later determined to be a thread of a malicious process, then the file can be restored by the file restoration manager 114 by using the file's backup hard link in the protected directory 116 to generate a replacement hard link having the same name as the original hard link for the target file. In some examples, the file restoration manager 114 then deletes the backup hard link.

Figure 2:
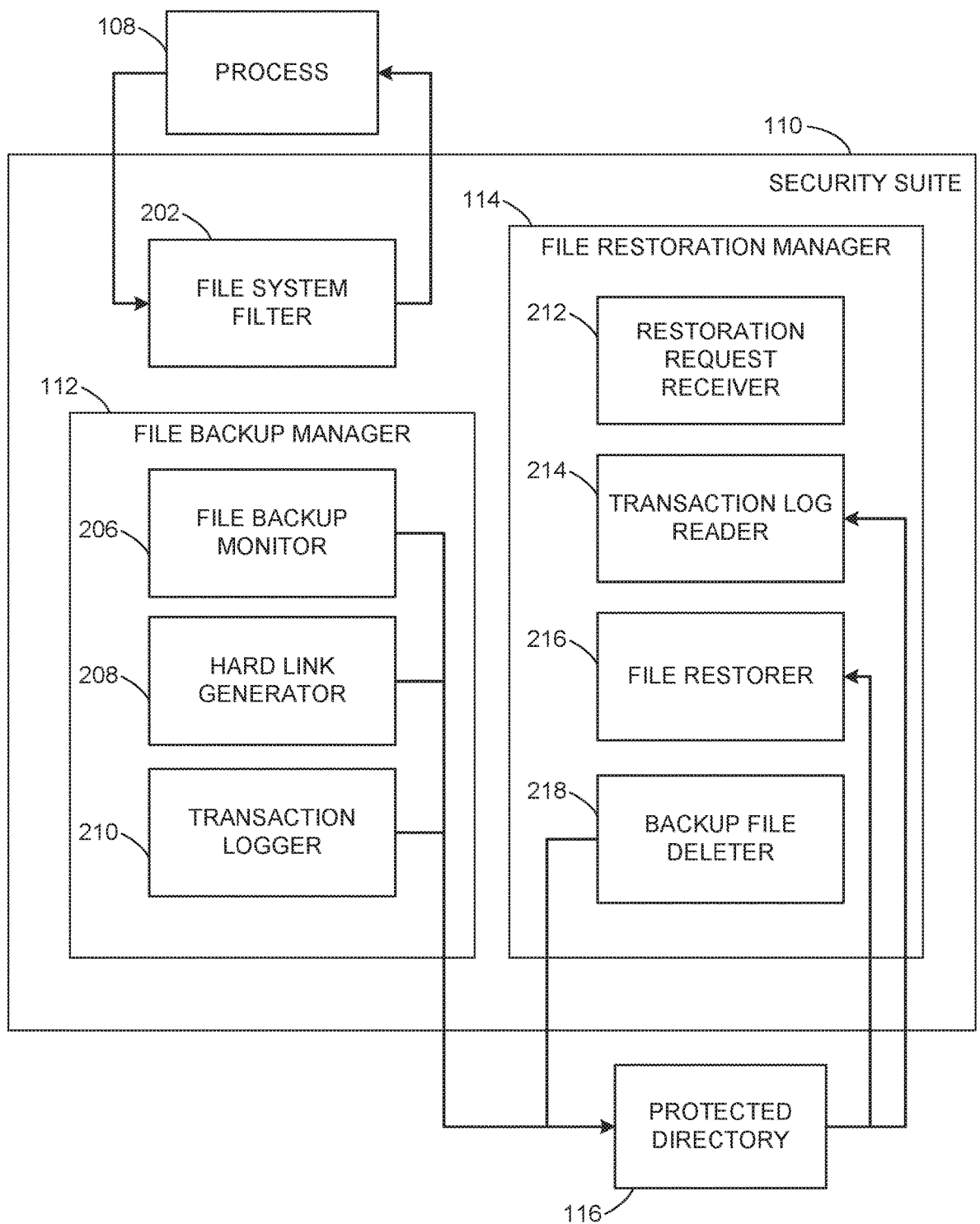
FIG. 2 is a block diagram illustrating an example implementation of the example security suite of FIG. 1.

A block diagram providing an example implementation of then example security suite 110 of FIG. 1 is illustrated in FIG. 2. The security suite 110 of FIG. 2 is implemented on a computing device 102 with a security suite 110 including the file backup manager 112 to create backup hard links and the file restoration manager 114 to create replacement hard links to restore deleted files. The security suite 110 additionally interacts with a protected directory 116 of the file system 104 that includes the target data file 106 to safeguard backup hard links from any of the processes 108 which may be malicious (e.g., malware).

In the illustrated example of FIG. 2, the example file backup manager 112 includes an example file system filter 202, an example file backup monitor 206, an example hard link generator 208, and an example transaction logger 210. The example file restoration manager 114 includes an example restoration request receiver 212, an example transaction log reader 214, an example file restorer 216, and an example backup file deleter 218.

The example file system filter 202 of the illustrated example of FIG. 2 filters process input/output (I/O) activity on the computing device 102. The example file system filter 202 assesses activity that occurs on the computing device 102 to determine whether the activity represents an input/output operation. Example input/output operations include read or write operations to memory, disks, hardware accelerators, peripherals, etc. The example file system filter 202 also assesses whether the input/output operation is an operation on a file, and further whether the operation is a file deletion operation. In some examples, the file system filter 202 is able to determine whether an operation is any other type of destructive operation. In the illustrated example of FIG. 2, the example file system filter 202 determines if a detected operation is a file deletion and, if so, calls or otherwise invokes the file backup manager 112, thereby implicitly blocking the thread of the process performing the operation from proceeding until the file backup manager 112 returns control to the file system filter 202. Upon the return of the file backup manager 112, the file system filter 202 will allow the deletion to proceed. In some examples, if the file system filter 202 determines an operation is not a deletion operation, the file system filter 202 will allow the operation to proceed without interruption. In some examples, the file system filter 202 may call the file backup manager 112 based on other criteria, such as a less restrictive requirement that the operation is any one of multiple operations classified as being destructive. In some examples, the file system filter 202 is configured to identify additional aspects of a target file determined to be subject to an input/output operation (e.g., such as whether the file involved in the I/O operation belongs to a set of system files, whether the file belongs to a set of files designated for protection, etc.) and/or to identify aspects of the process 108 performing the detected input/output operation (e.g., whether the process is a new process, whether the process is a duplicate of a system process, etc.).

The example file backup monitor 206 of the illustrated example of FIG. 2 is called or otherwise invoked by the file system filter 202 in response to a detected file deletion operation being performed by a thread of the process 108. The file backup monitor 206 performs a check if a target file that is pending deletion has been previously backed up. The example file backup monitor 206 may be configured to search in a specific directory for a backup file (e.g., the protected directory 116) or to scan the storage of the computing device 102 for a backup file corresponding to the target file. Additionally or alternatively, the example file backup monitor 206 may analyze a backup log or similar register to determine if a back up data file exists for the target file. In some examples, the file backup monitor 206 can be configured to search for complete copies of target files, to search for backup hard links, and/or the existence of any other backup formats, individually or in combination (e.g., such as both a backup hard link and a complete duplicate of the original file data). Further, the example backup monitor 206 may perform additional validation steps to determine the integrity of a backup (e.g., by ensuring file versions and contents match). The example file backup monitor 206 communicates the state of the backup file (at least information on the existence of a backup) for a target file to the hard link generator 208 and the transaction logger 210. In some examples, if an effective backup is found (e.g., a virtual or actual backup that is valid, and representative of the target file), the file backup monitor 206 informs the transaction logger 210 to enter a description of the malicious operation (e.g., whether it is a deletion, corruption, etc.) into the transaction log. The file backup manager 112 then returns control to the file system filter 202 to unblock the thread of the process and resume the operation.

The hard link generator 208 of the illustrated example of FIG. 2 creates backup hard links for target files that are pending deletion, as identified by the file system filter 202. The example hard link generator 208 creates a backup hard link (e.g., a second hard link to back up the original, first hard link referencing the target file) in the event that the file backup monitor 206 indicates that a backup does not exist for a target file that is pending deletion. In the illustrated example of FIG. 2, the hard link generator 208 creates a backup hard link, which references the target file data, in the protected directory 116. After the thread performing the deletion has been resumed and the original hard link is deleted, the target file remains as a virtual backup file since the file's data is retained due to the existence of the backup hard link. In some examples, the hard link generator 208 performs verification steps to determine if the operating system and file system support hard links. In some examples, if the hard link generator 208 determines that the file system of the computing device 102 does not support hard links, or if the process of creating a hard link encounters an error, the hard link generator 208 may create a complete copy of the target file's data in the protected directory 116 or in another location.

In some examples supporting Windows®, the hard link generator 208 of FIG. 2 generates a hard link using the CreateHardLink WIN32 application programming interface (API), which uses the ZwSetInformationFile system call to create the hard link. However, in some examples, the ZwSetInformationFile system call may be called directly by the hard link generator 208 to create the hard link. In some examples, the hard link is generated using the Windows® mklink command, which is a command line program that calls the CreateHardLink API, which further calls the ZwSetInformationFile system call. In additional or alternative examples, any method of creating a hard link can be utilized. In some examples, the example hard link generator 208 may cause the file backup manager 112 to return control to the file system filter 202 after the creation of the backup hard link and/or the creation of the full backup of the target file, thus effectively unblocking the thread of the process performing the input/output operation.

The example transaction logger 210 of the illustrated example of FIG. 2 creates, in a transaction log, a transaction log entry for each detected, destructive file I/O operation. Further, the example transaction logger 210 stores data including the type of I/O operation performed, the target file name, the target file location (e.g., address in the file system), the name of the process and/or specific thread executing the deletion, the date and time, and/or any combination thereof. In some examples, the target file name can include the directory path for the target file. In some examples, the transaction log may contain entries pertaining to other I/O events, and/or any other information entered by elements other than the transaction logger 210. In the illustrated example of FIG. 2, the transaction logger 210 creates and stores the transaction log in the protected directory 116. Additionally or alternatively, the transaction logger 210 can store the transaction log in any location accessible to the computing device 102. In some examples, the transaction log may be updated at regular time intervals. In such examples, the transaction log may be updated by appending new entries for destructive file operations that occur within the specified time interval to the current transaction log. In some examples, the transaction log may be archived, and a new transaction log may be created, upon an event occurrence (e.g., a restart of the computing device 102, an encounter with a new I/O operation, etc.). In some examples, the transaction logger 210 may log the information in any format or location, so long as the original target file name, the backup file name for a backup hard link that was for the target file, and other operation information, if any, is stored and made available for future use by the file restoration manager 114. In some examples, following the creation of a transaction log and/or transaction log entry, the transaction logger 210 may permit or cause the file backup manager 112 to return to the file system filter 202, thus allowing the file system filter 202 to effectively unblock the thread of the process performing the input/output operation.

In the illustrated example of FIG. 2, the example restoration request receiver 212 of the example file restoration manager 114 receives a request to initiate a file restoration task. The example restoration request receiver 212 processes this request and initiates the restoration process by providing information to the transaction log reader 214 and the file restorer 216. The information received by the restoration request receiver 212 and forwarded to the transaction log reader 214 and file restorer 216 may pertain to a specific process that has been identified as malicious by some element internal or external to the security suite 110. Additionally or alternatively, the restoration request 212 receiver may receive information from a user requesting the restoration of a deleted file. In some examples, the restoration request receiver 212 may operate as part of one or more component(s) of the security suite 110, such as a malware detection system, which automatically detects the malware and then initiates the restoration process internally by providing information to the transaction log reader 214 and file restorer 216.

The example transaction log reader 214 of the illustrated example of FIG. 2 obtains information from the transaction log that is pertinent to the file restoration process. The example transaction log reader 214 receives information from the restoration request receiver 212 regarding a restoration to be executed and then opens the transaction log file (e.g., by accessing the protected directory 116) corresponding to the request. For example, if the restoration request specifies a malicious process that was downloaded on day 1 and identified, quarantined and removed on day 5, the transaction log file(s) corresponding to days 1-5 will be opened. Further, in some examples, the example transaction log reader 214 determines if the relevant operations (e.g., those pertaining to the identified malicious operation) were destructive of the file. In some examples, this additionally or alternatively includes checking the file location to determine the existence and integrity of the target file. In addition to determining if the relevant operations were destructive, the transaction log reader 214 can further determine whether a backup was created, whether the operation was a file deletion, and whether the system supports hard links. In some examples, one or more of these actions (such as determining whether the operation was destructive) may not be included, as the transaction log may only consist of a log of operations already meeting these criteria, as recorded by the transaction logger 210. In the illustrated example of FIG. 2, the example transaction log reader 214 determines the original file name for a target file which will be restored from the appropriate transaction log entry. The example transaction log reader 214 additionally determines the location of the backup hard link which references the virtual backup file (e.g., the location of the second hard link), which will be used by the file restorer 216 to create a replacement hard link to restore the target file.

The example file restorer 216 of the illustrated example of FIG. 2 creates a replacement hard link (e.g., a third hard link, the first being the original hard link and second being the backup hard link) to the virtual backup file using the backup hard link (e.g., the second hard link) and the original target file name and path. The example file restorer 216 obtains information from the transaction log (e.g., in the protected directory 116) as extracted or identified by the transaction log reader 214. The creation of the replacement hard link by the example file restorer 216 results in a hard link in the same location as the original hard link to the target file, with the same file name, and with reference to the same file data. As a result, this replacement hard link effectively restores the target file.

In examples supporting Windows®, the file restorer 216 of FIG. 2 creates an example replacement hard link using any method as described for the hard link generator 208 (e.g., using the CreateHardLink API, using the ZwSetInformationFile system call, using the mklink Windows Command®, etc.). The example file restorer 216 creates the replacement hard link as a hard link to the backup hard link. If the backup file deleter 218 later deletes the backup hard link, the replacement hard link will still exist, referencing the original file data. In some examples where hard links are not supported, the file restorer 216 may utilize a full backup file, or another backup mechanism to restore the file. In such examples, if a full backup file does not exist, the file restorer 216 will not be initiated, as the transaction log reader 214 will identify the absence of a backup and terminate processing.

The example backup file deleter 218 of the illustrated example of FIG. 2 deletes the backup hard link upon the creation of the replacement hard link by the file restorer 216. The backup file deleter 218 deletes the backup hard link from the protected directory 116, or any location where the backup hard link is stored. In examples in which hard links are not supported, the backup file deleter 218 deletes the full backup file copy that has been utilized by the file restorer 216. In some examples, the example backup file deleter 216 may delay the deletion of the backup hard link or backup file by some period of time or until an additional event occurs (e.g., a backup storage memory threshold is reached, a user requests to clear the backup storage, etc.).

In operation, the file system filter 202 inspects an input/output operation being performed by a thread of a process 108. If the file system filter 202 detects a file deletion operation, the file system filter 202 calls the file backup manager 112, effectively blocking the operation. Upon the blocking of the thread, the file backup monitor 206 determines if a backup already exists for the file. If a backup does not exist, the hard link generator 208 creates a backup hard link in the protected directory 116 with reference to the target file data to, in effect, create a virtual backup file of the target file. The transaction logger 210 then records the original file name, the backup hard link location, information pertinent to the file operation and/or the thread performing the file operation, and any other information on the transaction and stores the transaction log to the protected directory 116. The transaction logger 210 and/or the hard link generator 208 then causes the file backup manager 112 to return control to the file system filer, thereby allowing the file system filter 202 to return control to the thread performing the deletion and effectively unblock the deletion operation. The file restoration manager 114 then can initiate a file restoration via information received by the restoration request receiver 212 pertaining to a specific process that is determined to be malicious or is determined to have performed undesired file destruction. Upon receipt of this request, the transaction log reader 214 opens the transaction log from the protected directory 116, determines the original file name and path and determines the backup hard link corresponding to the virtual backup file. This information is then passed to the file restorer 216 to create a replacement hard link to the backup hard link, using the file name and path of the original hard link. After the creation of this replacement hard link that, in effect, operates to restore the target file, the backup file deleter 218 deletes the backup hard link.

While an example manner of implementing the security suite 110 of FIG. 1 is illustrated in FIG. 2, one or more of the elements, processes and/or devices illustrated in FIG. 2 may be combined, divided, re-arranged, omitted, eliminated and/or implemented in any other way. Further, the example file backup manager 112, the example file restoration manager 114, the example protected directory 116, the example file system filter 202, the example file backup monitor 206, the example hard link generator 208, the example transaction logger 210, the example restoration request receiver 212, the example transaction log reader 214, the example file restorer 216, and the example backup file deleter 218 and/or, more generally, the example security suite 110 of FIG. 2 may be implemented by hardware, software, firmware and/or any combination of hardware, software and/or firmware. Thus, for example, any of the example file backup manager 112, the example file restoration manager 114, the example protected directory 116, the example file system filter 202, the example file backup monitor 206, the example hard link generator 208, the example transaction logger 210, the example restoration request receiver 212, the example transaction log reader 214, the example file restorer 216, and the example backup file deleter 218 and/or, more generally, the example security suite 110 could be implemented by one or more analog or digital circuit(s), logic circuits, programmable processor(s), application specific integrated circuit(s) (ASIC(s)), programmable logic device(s) (PLD(s)) and/or field programmable logic devices) (FPLD(s)). When reading any of the apparatus or system claims of this patent to cover a purely software and/or firmware implementation, at least one of the example security suite 110, the example file backup manager 112, the example file restoration manager 114, the example protected directory 116, the example file system filter 202, the example file backup monitor 206, the example hard link generator 208, the example transaction logger 210, the example restoration request receiver 212, the example transaction log reader 214, the example file restorer 216, and/or the example backup file deleter 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example security suite 110 of FIG. 2 may include one or more elements, processes and/or devices in addition to, or instead of, those illustrated in FIG. 2, and/or may include more than one of any or all of the illustrated elements, processes and devices.

Figure 3:
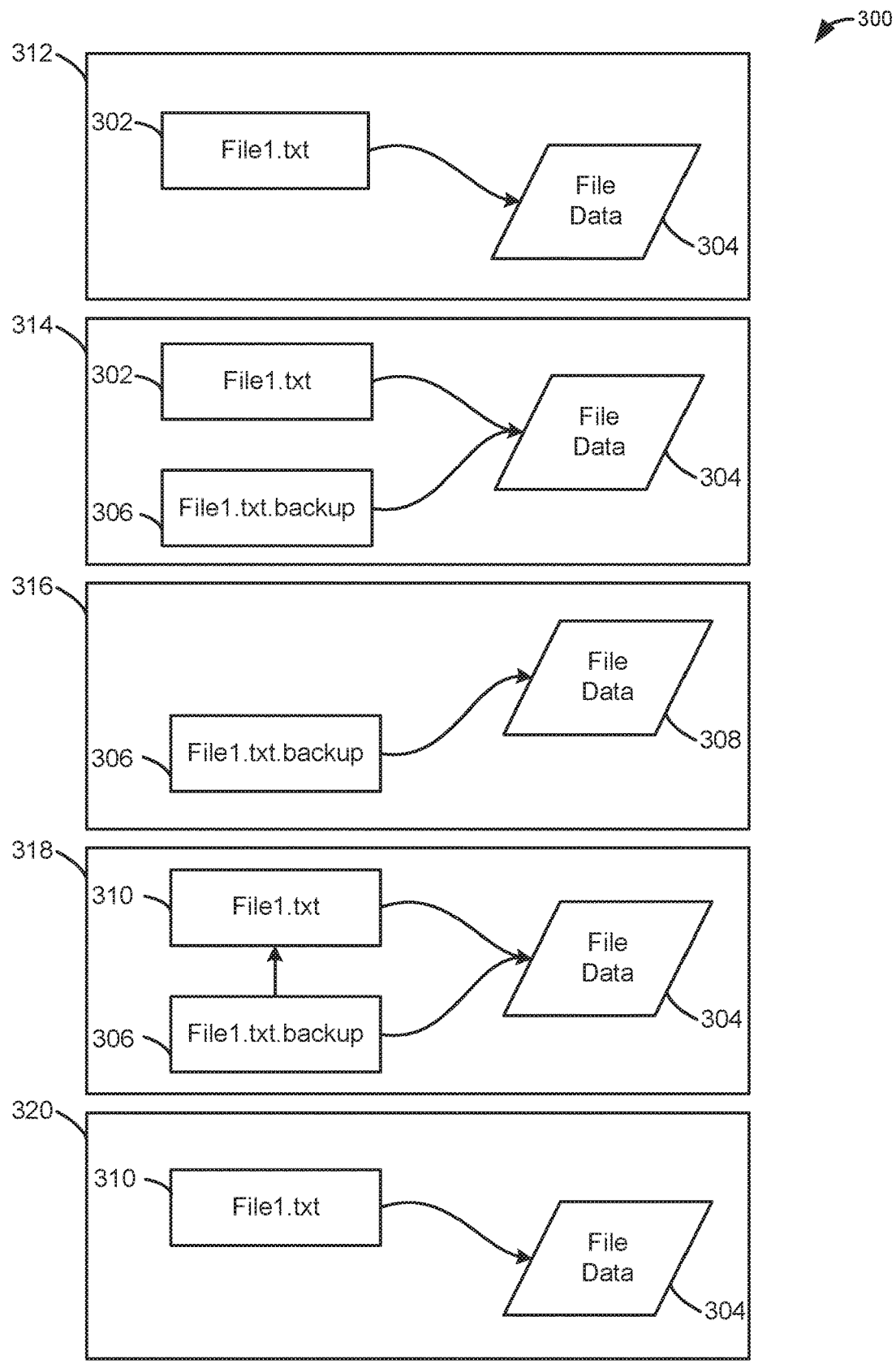
FIG. 3 is an example operation of the example security suite of FIGS. 1 and/or 2 to backup a file using hard links and to subsequently recover the file via a backup hard link.

An example operation 300 of the security suite 110 to create a backup hard link for a target file to be deleted and to restore the target file by creation of a replacement hard link using the backup hard link is illustrated in FIG. 3. In the example operation 300, an original hard link 302 references a target file 304. To back up the target file 304 in the event of a pending deletion of the target file 304, a backup hard link 306 is created in a protected directory 116 of the file system 104 that includes the target file 304. When the original hard link 302 is deleted, the target file then becomes a virtual backup file 308 which is accessible by the backup hard link 306 through the protected directory 116. Finally, a replacement hard link 310 is created to recover the original target file 304 in the original location with the same file name.

An example initial state 312 of the illustrated example operation 300 of FIG. 3 includes an original hard link 302 with a file name, for example, "File1.txt," which references a target file 304 including file data. The original hard link 302 may be in an unprotected location, where it can be modified or deleted by a thread of a process (e.g., malware or other process).

An example second state 314 of the illustrated example operation 300 of FIG. 3 includes the same original hard link 302 and target data 304 with the addition of a newly created backup hard link 306, which is created in a protected directory 116 and references the same target file 304. For example, in response to the detection of the deletion operation by the file system filter 202, the file system filter 202 effectively blocks the deletion operation by calling the file backup manager 112. The hard link generator 208 then creates the backup hard link 306 with the name "File1.txt.backup."

An example third state 316 of the illustrated example operation 300 of FIG. 3 includes the same backup hard link 306 after the file system filter 202 has returned control to the process thread performing the deletion operation and the original hard link 302 has been deleted by the thread of the process. The file data corresponding to the target file still exists, but is accessible only from the backup hard link 306 which is in a protected directory 116. Hence, the file data is now a virtual backup file 308 as it appears to have been deleted by the process thread performing the deletion operation and is available only via the backup hard link 306 in the protected directory 116. While the original hard link 302 has been deleted, the existence of the backup hard link 306 referencing the virtual backup file 308 ensures that the file data is still stored and available for later recovery of the original target file 304.

An example fourth state 318 of the illustrated example operation 300 of FIG. 3 includes a replacement hard link 310 with the original file name, for example, "File1.txt," created as a hard link to the backup hard link 306, both of which reference the target file 304. When the request for a file restoration is received by the restoration request receiver 212, the file restorer 216 creates this third hard link referred to as the replacement hard link 310 with the same file name and in the same location as the original hard link 302. This replacement hard link allows access to the target file 304 and completes the recovery of the deleted target file. The file data is now again referred to as the target file, as it is readily available in the unprotected directory, indistinguishable from the initial state.

An example fifth state 320 of the illustrated example operation 300 of FIG. 3 includes the replacement hard link 310 referencing the target file 304. Following the creation of the replacement hard link 310 in the fourth state 318, the backup file deleter 218 deletes the backup hard link 306, as the original hard link 302 and the target file 304 have been restored to their initial state.

Flowcharts representative of example machine readable instructions for implementing the security suite 110 of FIG. 2 are shown in FIGS. 4-7. In these examples, the machine readable instructions comprise one or more programs for execution by a processor such as a processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entire program(s) and/or parts thereof could alternatively be executed by a device other than the processor 812 and/or embodied in firmware or dedicated hardware. Further, although the example program(s) is (are) described with reference to the flowcharts illustrated in FIGS. 4-7, many other methods of implementing the example security suite 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4, 5, 6 and/or 7 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 4:
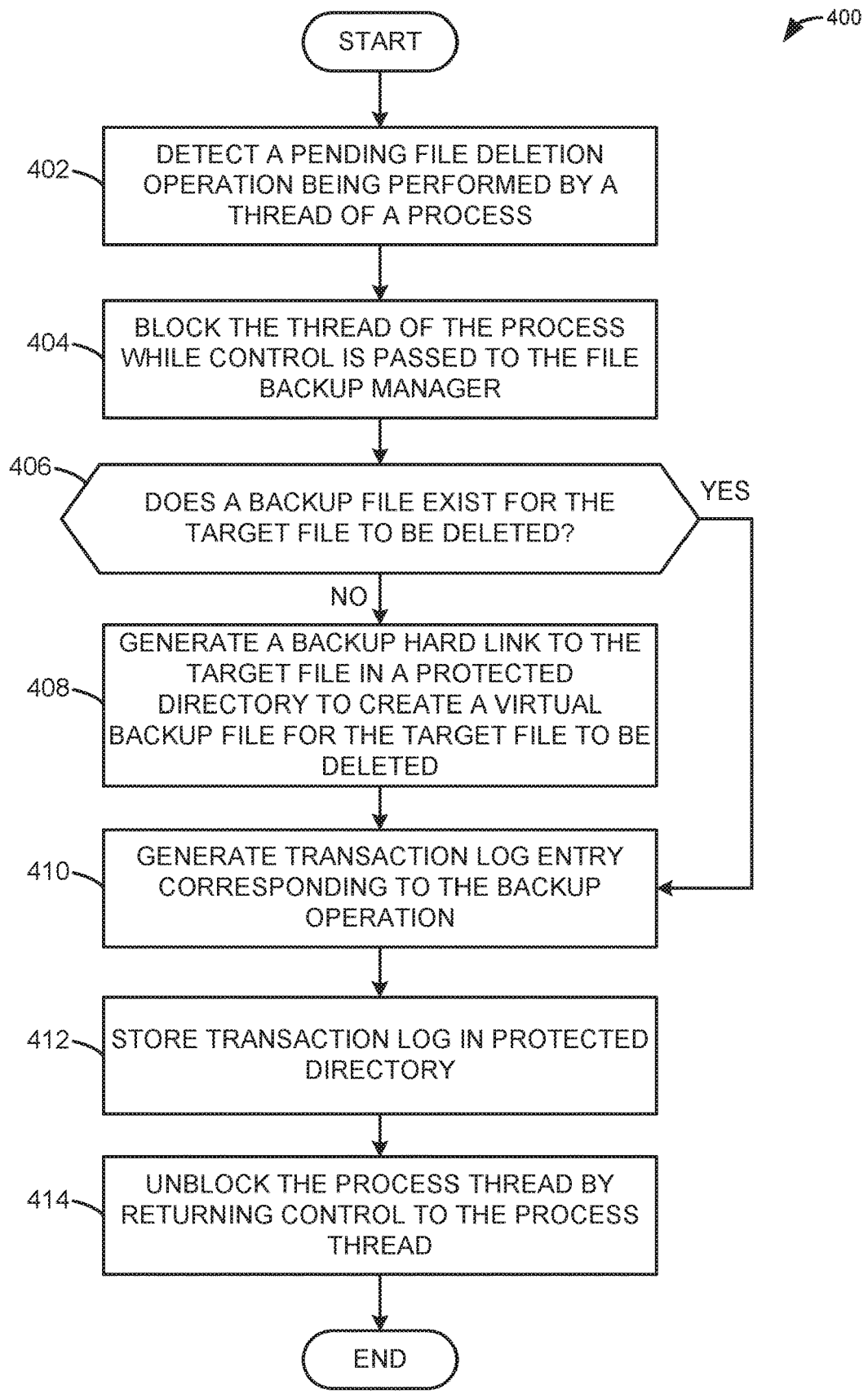
FIG. 4 is a flowchart representative of first example machine readable instructions that may be executed to implement the example file backup manager of FIG. 2.

Example machine readable instructions 400 for implementing the example file backup manager 118 of FIG. 2 and that may be executed to perform the creation of a backup hard link for a target file pending are illustrated in FIG. 4. With reference to the preceding figures and associated descriptions, the example machine readable instructions 400 of FIG. 4 begin with the example file system filter 202 detecting a pending file deletion operation executed by a thread of a process 108 on the computing device 102 (block 402).

At block 404, the example file system filter 202 blocks the thread of the process performing the file deletion while control is passed to the file backup monitor. The file system filter 202 blocks the process by handing control to the file backup manager 112, thereby enabling the file backup manager 112 to perform a file backup and then return to allow the file system filter 202 to return control to the process thread and unblock the deletion operation (see block 414).

At block 406, the example file backup monitor 206 determines if a backup file exists for the target file to be deleted. The example backup file monitor 206 may identify a backup file in the form of a hard link in a protected directory 116 or any other location, or a complete copy of the file in any location accessible by the security suite 110. In some examples, the backup file or files may be of any type or format that enable the complete and accurate restoration of the target file after deletion. In response to a backup file being found, processing transfers to block 410. Conversely, if no backup file is found, processing transfers to block 408.

At block 408, the example hard link generator 208 generates a backup hard link to the target file in a protected directory 116 of the file system 104 that includes the target file to create a virtual backup file for the target file to be deleted. Additionally or alternatively, the backup hard link may be created and stored in any other protected location.

At block 410, the example transaction logger 210 generates a transaction log entry corresponding to the backup operation. In some examples, the transaction log entry may actually be multiple entries corresponding to the backup operation, or an entirely new file. The example transaction log entry includes the original file name of the target file to be deleted, as well as the location of the backup hard link and other pertinent information regarding the file operation and/or the process performing the file operation. If a backup was found by the file backup monitor 206 (Block 406, "Yes"), the example transaction log may contain information such as the location of the backup file(s), the integrity of the backup file(s), or any other pertinent information regarding the file operation and/or the process performing the file operation.

At block 412, the example transaction logger 210 stores the transaction log in the protected directory 116. In some examples, the transaction log is stored anywhere that it is accessible by the security suite 110, with preference that the location be protected from read/write access by processes other than those integral to or approved by the security suite 110.

At block 414, the example file system filter 202 unblocks the thread of the process performing the deletion by returning control to the process thread, thus allowing the original hard link to be deleted. Upon the deletion of the original hard link, the target file data is still accessible through the protected (and optionally, hidden) backup hard link and, thus acts as a virtual backup of the target data file. While the target file includes the same data contents, it is now referred to as a virtual backup file since its original hard link has been deleted.

Figure 5:
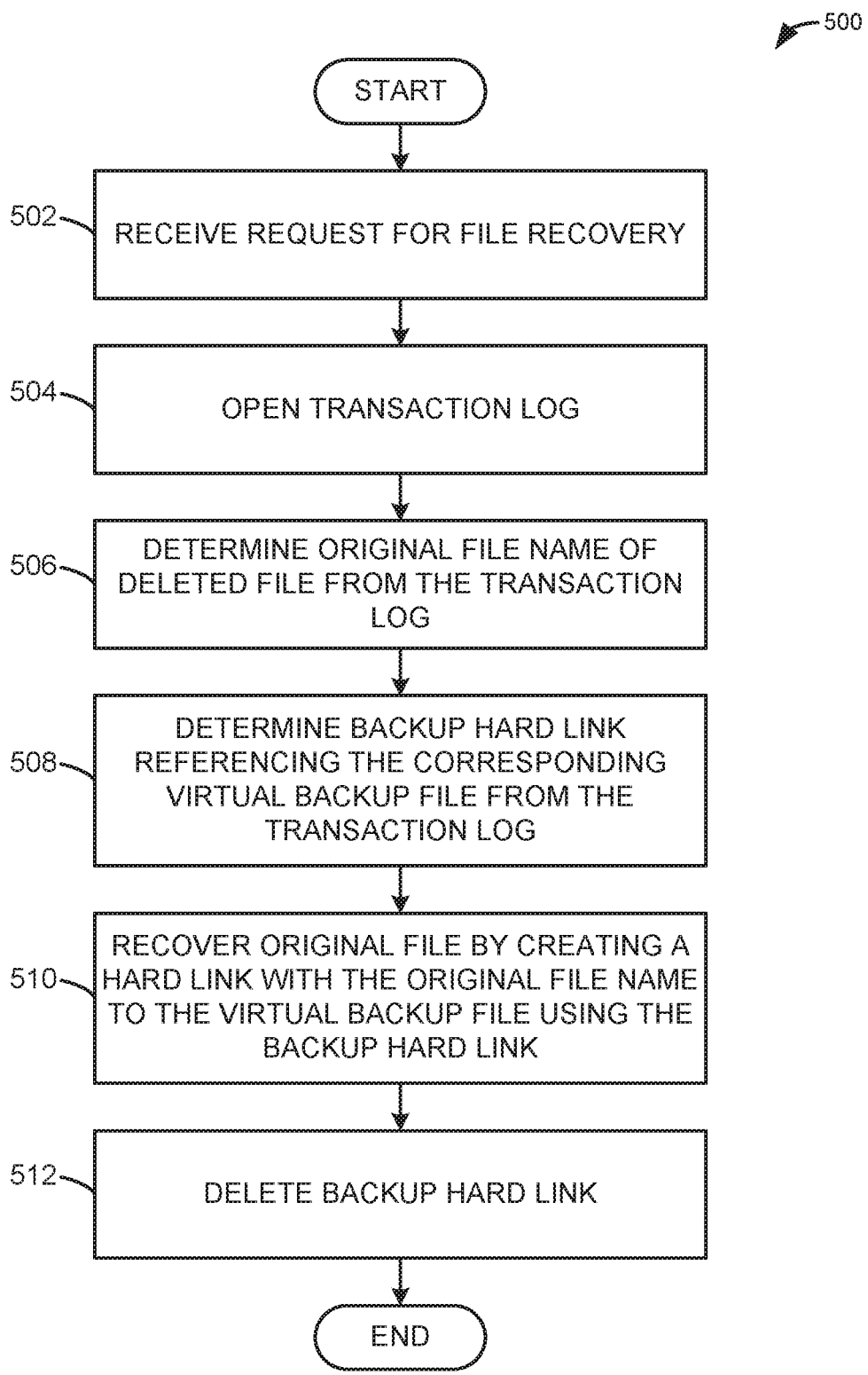
FIG. 5 is a flowchart representative of first example machine readable instructions that may be executed to implement the example file restoration manager of FIG. 2.

Example machine readable instructions 500 for implementing the file restoration manager 114 of FIG. 2 and that may be executed to perform the restoration of the original hard link for a target file that has been deleted are illustrated in FIG. 5. With reference to the preceding figures and associated descriptions, the example machine readable instructions 500 of FIG. 4 begin with the example restoration request receiver 212 receiving a request for the recovery of a target file that has been deleted (block 502). The example request may be an indication of a specific process that has executed on the computing device 102, with instructions to restore any files deleted by any thread of this process. Additionally or alternatively, the example request includes details as to specific files which are to be restored, a time frame, directory, drive, and/or subset of files within which to restore files.

At block 504, the example transaction log reader 214 opens the transaction log. The example transaction log may be stored in the protected directory 116, or in any other location accessible to the security suite 110. The example transaction log is stored in a protected manner to prevent deletion, modification or destruction (e.g., corruption) by a process that is not integral to or authorized by the security suite 110.

At block 506, the example transaction log reader 214 determines the original file name of the deleted file from the transaction log. The example transaction log reader 214 extracts this original file name for use by the file restorer 216 in creating the replacement hard link as a duplicate of the original hard link. The example transaction log reader 214 additionally or alternatively extracts the original file path, including the file name, for use in creating the replacement hard link.

At block 508, the example transaction log reader 214 determines the backup hard link referencing the corresponding virtual backup file from the transaction log. The example transaction log reader 214, for any specific file to be restored, identifies the location of the file's backup hard link to enable the example file restorer 216 to create the replacement hard link. The example transaction log reader 214 extracts the address of the backup hard link in the file system from the transaction log.

At block 510, the example file restorer 216 recovers the original file by creating a replacement hard link with the original file name to the virtual backup file using the backup hard link. The example file restorer 216 receives the information extracted from the transaction log by the example transaction log reader 214 to create a replacement hard link duplicates the original hard link. The example file restorer 216 completes the restoration process, causing the virtual backup file to become accessible from the original hard link, as opposed to solely from a protected, hidden directory. Hence, the restoration of the original hard link returns the virtual backup file to its original target file state.

At block 512, the example backup file deleter 218 deletes the backup hard link. Following the restoration of the original hard link and target file by the replacement hard link, the backup hard link is no longer necessary and can be deleted. In some examples, the example backup file deleter 218 may delete the backup hard link after a specified amount of time or once a specified threshold storage limit is reached (e.g., corresponding to purging "used" backup hard links upon a storage threshold being reached). In some examples, the backup file deleter 218 may delete the backup hard links only for a specific subset of files that have been restored, or not at all (e.g., to serve as a backup image in the event that a file is deleted and the file backup manager 112 fails to create a new backup hard link). In some examples, the example backup file deleter 218 may delete backup files (or permit the overwrite thereof) only upon the creation of a new backup hard link or complete copy for a file.

Figure 6:
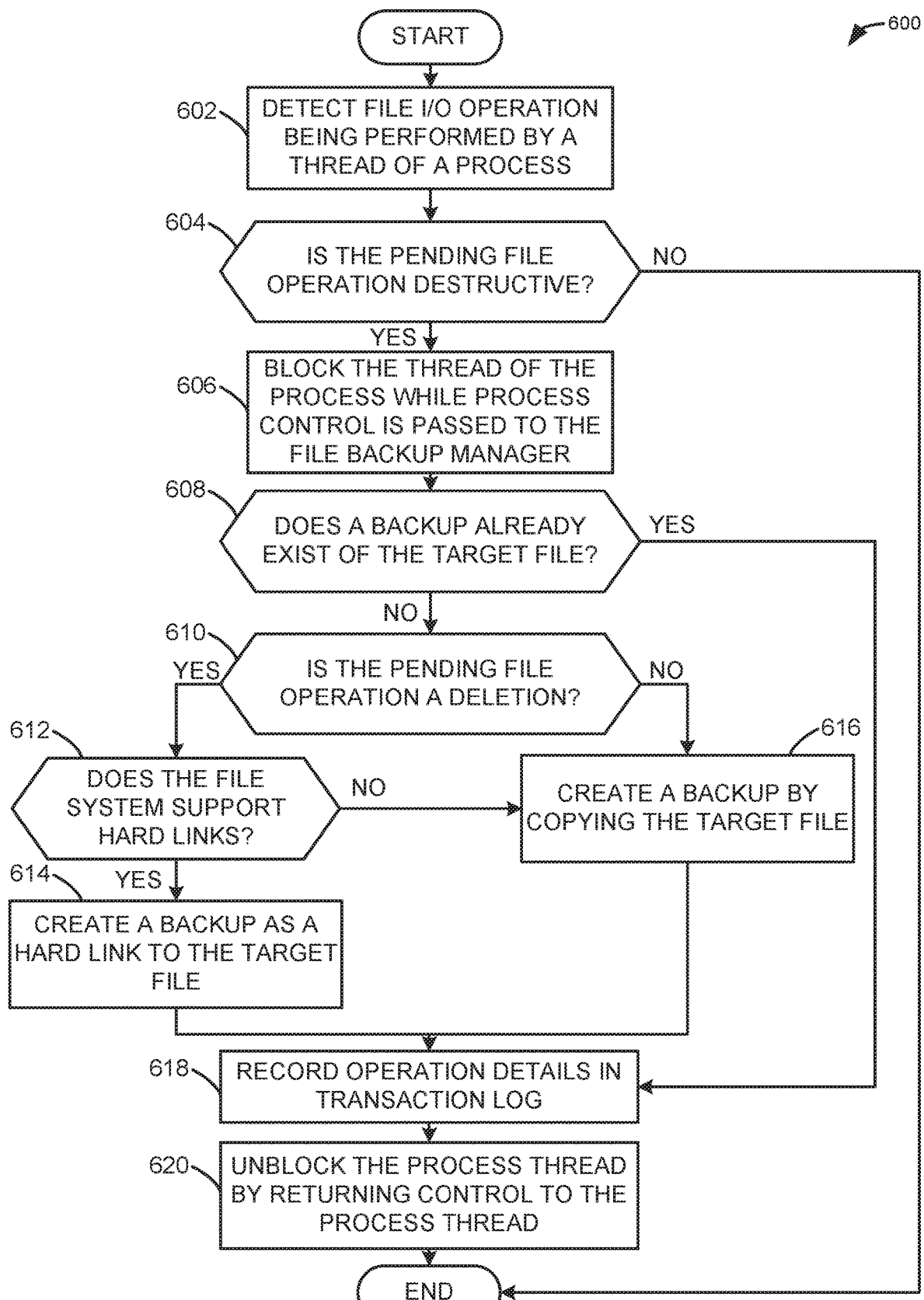
FIG. 6 is a flowchart representative of second example machine readable instructions that may be executed to implement the file backup manager of FIG. 2.

Example machine readable instructions 600 illustrated in FIG. 6 represent a second example of machine readable instructions for implementing the example file backup manager 112 of FIG. 2 and that may be executed to perform the creation of a backup hard link for a target file pending deletion. With reference to the preceding figures and associated descriptions, the example machine readable instructions 600 of FIG. 6 begin with the example file system filter 202 detecting a new file I/O operation being performed by a thread of a process (block 602).

At block 604, the example file system filter 202 determines if the pending file operation is destructive. Example destructive operations include a file deletion, a file corruption, an unauthorized file modification (e.g., encryption), or any operation which compromises the integrity, accessibility and contents of a file. The example file system filter 202 can be pre-configured to identify specific operations as destructive, as well as be reconfigured at any time to include or remove file operations from the set of destructive operations. In response to the pending file operation being determined to be destructive, processing transfers to block 606. Conversely, if the pending file operation is determined not to be destructive, processing terminates.

At block 606, the example file system filter 202 blocks the thread of the process while control is passed to the file backup manager. The example file system filter 202 blocks the process by handing control to the file backup manager 112, thereby enabling the file backup manager 112 to perform a file backup and then return to allow the file system filter 202 to return control to the process thread and unblock the destructive operation (see block 620).

At block 608, the example file backup monitor 206 determines if a file backup already exists for the target file. The example file backup may exist as a complete copy of the target file, as a backup hard link to the target file, or using any other method which allows for a complete and accurate restoration of the target file after its deletion. In some examples, the file backup monitor 206 may check if a file backup exists for the case of a deletion, prior to the creation of backup copy. In some examples, the example file backup monitor 206 may not exist, and a new backup may be created which overwrites any existing backups (e.g., full copies or hard links). In response to the example file backup monitor 206 determining that a backup file already exists for the target file, processing transfers to block 618. Conversely, if the example file backup monitor 206 determines that a backup file does not exist for the target file, processing transfers to block 610.

At block 610, the example file system filter 202 determines if the pending file operation is a deletion. The example file system filter 202 determines this to direct the hard link generator 208 and the file backup monitor 206 with instructions to proceed, as the method of backup creation is dependent on whether the file operation is a deletion. If the example file system filter 202 determines the pending file operation to be a deletion, then the backup hard link method can be utilized. For other destructive file operations, the example file backup manager 112 in this example set of instructions creates a full backup copy of the file. In response to the pending file operation being determined to be a deletion, processing transfers to block 612. Conversely, if the pending file operation is not a deletion, processing transfers to block 616.

At block 612, the example hard link generator 208 determines if the file system supports hard links. Additionally or alternatively, the hard link generator 208 may determine if the operating system supports hard links, or if any other mechanism exists with which the hard link generator 208 is to interact for the creation of a hard link. In response to the file system supporting hard links, processing transfers to block 614. Conversely, if the file system does not support hard links, processing transfers to 616.

At block 614, the example hard link generator 208 creates a backup as a hard link to the target file. The hard link generator 208 creates the backup hard link in the protected directory 116 of the file system 104 that includes the target file, or in another location protected from any process or thread not integral to or authorized by the security suite 110. The example backup hard link can be created by any method of creating a hard link that serves to retain the target file after the deletion of the original hard link referencing the target file.

At block 616, the example hard link generator 208 creates a backup as a complete copy to the target file. In this case, the example hard link generator 208 is unable to create a hard link due to a lack of support for hard links, the file operation not being a deletion, or some other requirement of the hard link generator 208 not being met. The example hard link generator 208 creates a complete copy of the target file in the protected directory 116 of the file system 104 that includes the target file, or in another location protected from processes or threads not integral to or authorized by the security suite 110.

At block 618, the example transaction logger 210 records operation details in the transaction log. The example transaction logger 210 records data including the file name and path of the original hard link, the name and path of the backup hard link that is created by the hard link generator 208, any relevant information about the process performing the deletion, and/or any combination thereof. The example transaction logger 210 may additional or alternatively store any other relevant information to the operation, such as the date and time of the backup creation.

At block 620, the example file system filter 202 unblocks the thread of the process performing the destructive file operation by returning control to the process thread. The example file backup manager 112 may return and allow the file system filter 202 to pass control to the thread performing the destructive operation immediately following the creation of a backup hard link or a backup file and the creation of a transaction log entry, or at some other time after these events.

Figure 7:
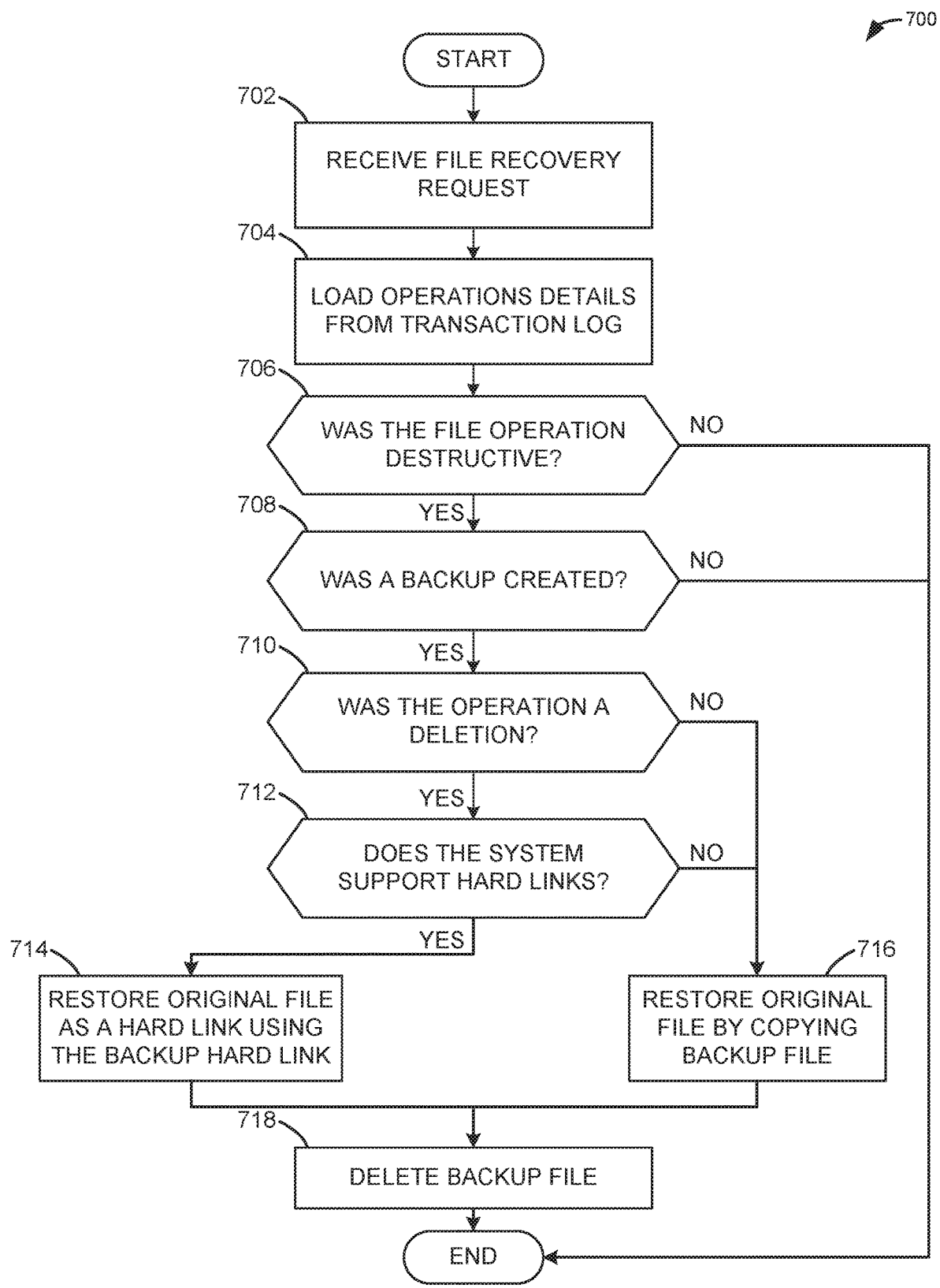
FIG. 7 is a flow chart representative of second example machine readable instructions that may be executed to implement the file restoration manager of FIG. 2.

Example machine readable instructions 700 illustrated in FIG. 7 represent a second example of machine readable instructions for implementing the example file restoration manager 114 of FIG. 2 and that may be executed to perform the restoration of the original hard link for a target file that has been deleted. With reference to the preceding figures and associated descriptions, the example machine readable instructions 700 of FIG. 7 begin with the example restoration request receiver 212 receiving a file recovery request (block 702). The example request may be an indication of a specific process that has executed on the computing device 102, with instructions to restore any files deleted by any thread of this process. Additionally or alternatively, the example request may specify specific files which are to be restored, or a time frame, directory, drive, or subset of files to be restored.

At block 704, the example transaction log reader 214 loads operations details from the transaction log. The operation details loaded from the transaction log include the process which performed the file operation, the type of operation that was performed, the time and date of the operation, the original file name and path, the existence of a backup, the support for hard links by the computing device 102, the backup copy or hard link name and path, and/or any combination thereof. The example transaction log reader 214 may additionally load any other details which are pertinent to the file restoration operation.

At block 706, the example transaction log reader 214 determines if the file operation was destructive. The example transaction log reader 214 may determine if the operation was destructive based on the details loaded from the transaction log, as described at block 704. In response to determining that the file operation was destructive, processing proceeds to block 708. Conversely, in response to determining that the operation was not destructive, processing terminates.

At block 708, the example transaction log reader 214 determines if a backup was created. The example transaction log reader 214 may determine if a backup was created based on the details loaded from the transaction log, as described at block 704. The example backup may be a complete copy of the original file, a backup hard link referencing the virtual backup file, or any other backup format enabling the complete and accurate restoration of the original hard link and target file. In response to determining that a backup was created, processing transfers to block 710. Conversely, in response to determining that a backup was not created, processing transfers to block 716.

At block 710, the example transaction log reader 214 determines if the file operation was a deletion. The example transaction log reader 214 may determine if the file operation was a deletion based on the details loaded from the transaction log, as described at block 704. The example file restorer 216 restores the file using the appropriate backup format (e.g., a complete copy or a hard link) based upon the outcome of this determination. In response to the example transaction log reader 214 determining the file operation to be a deletion, processing transfers to block 712. Conversely, if the example transaction log reader 214 determines the file operation not to be a deletion, processing transfers to block 716.

At block 712, the example transaction log reader 214 determines if the system (e.g., computing device 102 and associated operating system and file system) supports hard links. The example transaction log reader 214 may determine if the system supports hard links based on the details loaded from the transaction log, as described at block 704. Additionally or alternatively, the file restorer 216 may perform this determination. In some examples, the example transaction log reader 214 or the file restorer 216 checks the system characteristics (e.g., operating system, file system, etc.) directly to determine if the system supports hard links. In response to determining the system to support hard links, processing transfers to block 714. Conversely, in response to determining the system not to support hard links, processing transfers to block 716.

At block 714, the example file restorer 216 restores the original file using the backup hard link. The example file restorer 216 creates a replacement hard link which has the same name and path as the original hard link, and refers to the same target file including the same data as the original target file. Hence, the example file restorer 216 restores the original file to a state where it is identical in name, location and contents to the original target file. The example file restorer 216 may create the replacement hard link using any method, as long as it creates a hard link which is effectively identical to the original hard link.

At block 716, the example file restorer 216 restores the original file by copying the backup file. The example file restorer 216 moves the full backup file to the location of the original file and assigns it the same name as the original file, effectively restoring the original file.

At block 718, the example backup file deleter 218 deletes the backup file. The backup file may be the full backup file, or the backup hard link. In some examples, the example backup file deleter 218 may delete the backup after a specified amount of time or once a specified threshold storage limit is reached (e.g., corresponding to purging the "used" backup upon a storage threshold being reached). In some examples, the backup file deleter 218 may only delete the backups for a specific subset of files that have been restored, or not at all (e.g., to serve as a backup image in the event that a file is deleted and the file backup manager 112 fails to create a new backup hard link). In some examples, the example backup file deleter 218 may only delete backup files (or permit the overwrite thereof) upon the creation of a new backup file.

Figure 8:
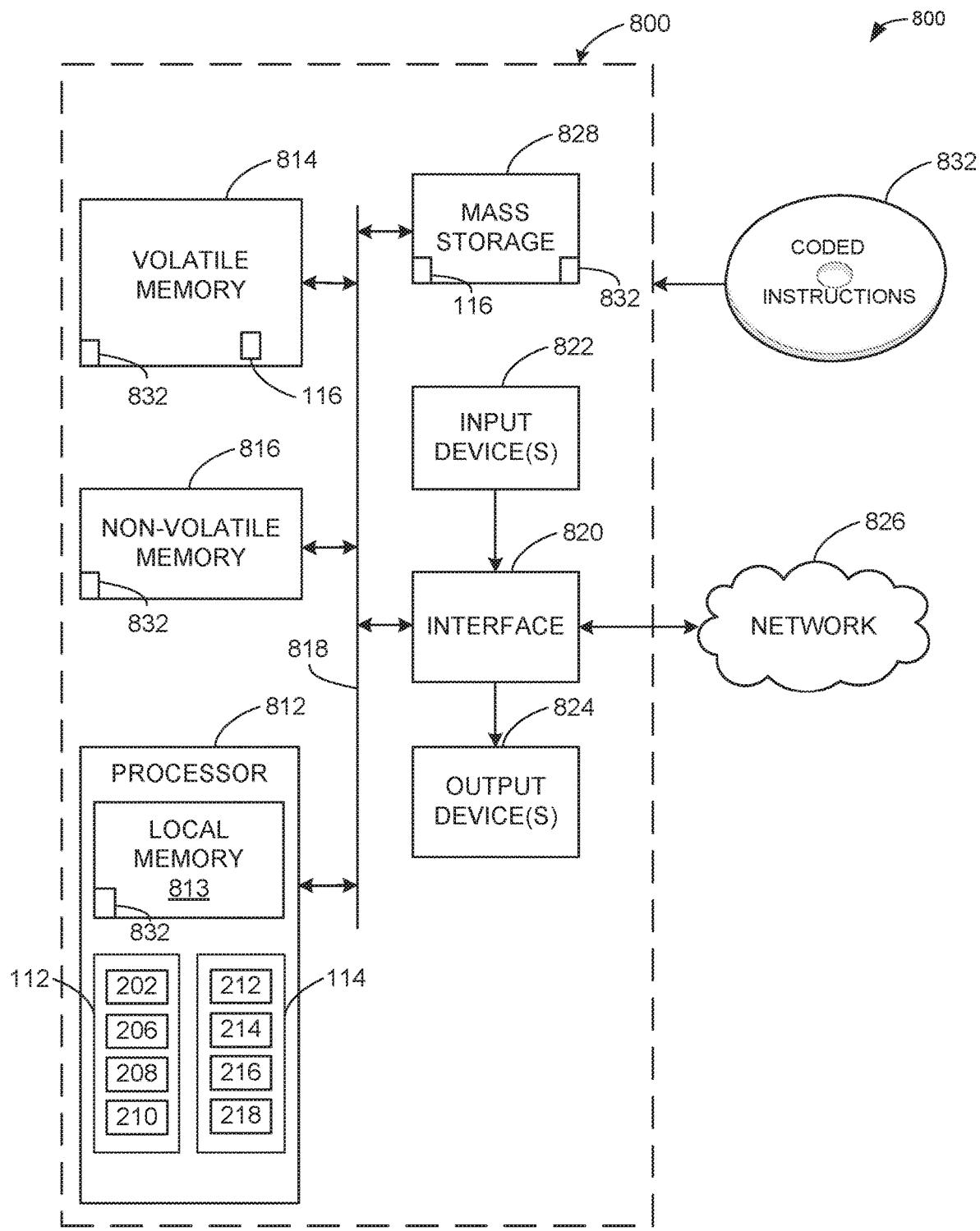
FIG. 8 is a schematic illustration of an example processor platform structured to execute the instructions of FIGS. 4, 5, 6 and/or 7 to implement the example security suite of FIGS. 1 and/or 2.

FIG. 8 is a block diagram of an example processor platform 800 structured to execute the example instructions of FIGS. 4, 5, 6 and/or 7 to implement the example security suite 110 of FIGS. 1 and/or 2. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 implements the example file backup manager 112, the example file restoration manager 114, the example file system filter 202, the example file backup monitor 206, the example hard link generator 208, the example transaction logger 210, the example restoration request receiver 212, the example transaction log reader 214, the example file restorer 216, and/or the example backup file deleter 218.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a peripheral component interconnect (PCI) express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and DVD drives. In the illustrated example, the storage device(s) 828 and/or the volatile memory 814 implement the example protected directory 116.

The coded instructions 832 of FIGS. 4, 5, 6 and/or 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable the creation of hard links for the backup and subsequent restoration of files deleted by processes on a computing device. The disclosed methods, apparatus and articles of manufacture provide increased speed and significantly reduced storage for the automated backup of files that are pending deletion as compared to conventional methods (e.g., copy-on-write). As a result, the user experience on the computing device is enhanced through the protected backup of deleted files without a significant storage footprint and no perceptible loss of speed on the computing device. Disclosed example methods, apparatus and articles of manufacture further enable restoration of the files upon the determination that a malicious process (e.g., malware) has performed file deletion operations on the computing device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising computer readable instructions that, when executed, cause a processor to at least:
    determine whether a first operation to be performed by a thread of a process on a target file stored on a computing device is a file deletion operation that is to delete the target file, the target file referenced by a first hard link;
    create, in response to the first operation being the file deletion operation, a second hard link to the target file, the thread of the process to be blocked while the second hard link is created;
    return control to the thread of the process after the second hard link is created to enable the first operation to be performed on the target file; and
    in response to a request to restore the target file after the target file has been deleted, restore the target file by creating a third hard link based on the second hard link and an original file name of the target file, the original file name retrieved from a transaction log.

2. The non-transitory computer readable storage medium of claim 1, wherein the instructions, when executed, further cause the processor to generate a transaction log entry including the original file name of the target file and a backup file name corresponding to the second hard link in response the first operation being the file deletion operation.

3. The non-transitory computer readable storage medium of claim 1, wherein the instructions, when executed, further cause the processor to receive the request to restore the target file after the target file has been deleted.

4. The non-transitory computer readable storage medium of claim 1, wherein the instructions, when executed, further cause the processor to delete the second hard link after the target file has been restored.

5. The non-transitory computer readable storage medium of claim 1, wherein the second hard link is created in a protected directory.

6. An apparatus to protect data with hard links, the apparatus comprising:
    a hard link generator to create a second hard link on a computing device to a target file referenced by a first hard link, the hard link generator to create the second hard link in response to a determination that a first operation being performed on the target file by a thread of a process is a file deletion operation that is to delete the target file;
    a file system filter to:
        determine whether the first operation being performed on the target file is the file deletion operation;
        invoke the hard link generator in response to determining the first operation is the file deletion operation, the thread of the process to be blocked from performing the first operation while the hard link generator is invoked; and
        return control to the thread of the process after the second hard link is created; and
    a file restorer to, in response to a request to restore the target file after the target file has been deleted, restore the target file by creating a third hard link based on the second hard link and an original file name of the target file, the original file name to be retrieved from a transaction log, wherein at least one of the hard link generator, the file system filter, or the file restorer is implemented by at least one of hardware or at least one processor.

7. The apparatus of claim 6, further including a transaction logger to generate a transaction log entry including the original file name of the target file and a backup file name corresponding to the second hard link in response to the first operation being the file deletion operation.

8. The apparatus claim 6, further including a restoration request receiver to receive the request to restore the target file after the target file has been deleted.

9. The apparatus of claim 6, further including a backup file deleter to delete the second hard link after the target file has been restored.

10. The apparatus of claim 6, wherein the second hard link is created in a protected directory.

11. A method to backup data with hard links, the method comprising:
    determining, by executing an instruction with a processor, whether a first operation to be performed on a target file by a thread of a process is a file deletion operation that is to delete the target file, the target file referenced by a first hard link;
    in response to determining the first operation is the file deletion operation, creating, by executing an instruction with the processor, a second hard link to the target file, the thread of the process to be blocked while the second hard link is created;
    returning control, by executing an instruction with the processor, to the thread of the process after the second hard link is created to enable the first operation to be performed on the target file; and in response to a request to restore the target file after the target file has been deleted, restoring the target file, wherein the restoring of the target file includes:

creating a third hard link based on the second hard link and an original file name of the target file, the original file name retrieved from a transaction log; and deleting the second hard link.

12. The method of claim 11, further including generating a transaction log entry including the original file name of the target file and a backup file name corresponding to the second hard link in response to determining the first operation is the file deletion operation.

13. The method of claim 11, further including receiving the request to restore the target file after the target file has been deleted.

14. The method of claim 11, wherein the second hard link is created in a protected directory.

* * * * *